United States Patent [19]

Hirozawa et al.

[11] 4,210,549

[45] Jul. 1, 1980

[54] HYDROXYBENZOIC ACID AS PH BUFFER AND CORROSION INHIBITOR FOR ALKALI METAL SILICATE-CONTAINING ANTIFREEZE COMPOSITIONS

[75] Inventors: Stanley T. Hirozawa, Birmingham, Mich.; Edward F. O'Brien, Cromwell, Conn.; Joe C. Wilson, Belleville, Mich.

[73] Assignee: BASF Wyandotte Corporation, Wyandotte, Mich.

[21] Appl. No.: 351

[22] Filed: Jan. 2, 1979

[51] Int. Cl.$^2$ ............................................. C09K 15/32
[52] U.S. Cl. ........................................ 252/76; 252/73; 252/75; 252/77; 252/78.1; 252/78.3; 252/389 R; 252/396; 422/14; 422/7; 422/17; 422/18
[58] Field of Search .................... 252/76, 76, 77, 73, 252/78.1, 78.3, 389 R; 422/14, 7, 13, 17, 18

[56] References Cited

U.S. PATENT DOCUMENTS 2,094,564  9/1937  Schenck et al. ...................... 252/73

FOREIGN PATENT DOCUMENTS 0637901  3/1962  Canada ...................................... 252/75

*Primary Examiner*—Mayer Weinblatt
*Attorney, Agent, or Firm*—Andrew E. Pierce

[57] ABSTRACT

This invention relates to single-phase antifreeze or coolant concentrates comprising a major proportion of at least one alcohol, at least one water-soluble silicate, and an organic basic pH buffer and corrosion inhibitor comprising at least one hydroxybenzoic acid. The concentrates can be used without dilution but are preferably used, upon dilution with water. The concentrates are generally diluted for use in with about 25 to about 90 percent by weight of water based upon the total weight of the concentrate. The alcohol is preferably ethylene glycol. The alcohol-based antifreeze and coolant compositions of the invention are effective in the protection against corrosion of all metals and alloys used in industrial processes and are especially effective when used to inhibit the corrosion of aluminum internal combustion engine and radiator components.

7 Claims, No Drawings

HYDROXYBENZOIC ACID AS PH BUFFER AND CORROSION INHIBITOR FOR ALKALI METAL SILICATE-CONTAINING ANTIFREEZE COMPOSITIONS

BACKGROUND OF THE INVENTION

1. Field of the Invention

This invention relates to alcohol based antifreeze and coolant compositions containing corrosion inhibitors for use primarily in water-circulating systems such as internal combustion engines, heat exchangers, cooling towers, and the like.

2. Description of the Prior Art

Antifreeze concentrates containing alcohols such as ethylene glycol are commonly diluted with water to prepare cooling system compositions for internal combustion engines in order to depress the freezing point of water. It is known that the alcohols utilized gradually decompose in the cooling system to produce acidic products which lower the pH of the coolant. It is also known that metallic surfaces in internal combustion engines which are in contact with such coolants become seriously corroded and that the corrosion effects generally become progressively worse as the pH of the coolant decreases. The recent tendency toward the use of aluminum in internal combustion engines, for instance, aluminum cylinder heads, aluminum water pumps and aluminum radiator cores, makes desirable improved, less corrosive antifreeze compositions. It has also been recognized in the art that antifreeze compositions are most desirably single-phase systems which have good shelf stability such that when such concentrates reach the consumer prior to dilution with water to form the coolant composition, such compositions contain the proper proportion of each phase and exhibit no gelation.

Numerous antifreeze compositions are known in the art which contain corrosion inhibitors and inhibitors for preventing decomposition of the alcohol utilized, for instance, ethylene glycol. These corrosion inhibitors and stabilizers for alcohol decomposition include both organic materials and inorganic materials. Illustrative of the organic materials that have been used in antifreeze compositions are guanadine, citrates, coal tar derivatives, petroleum bases, thiocyanate, peptones, phenols, thioureas, tannin, quinoline, morpholine, triethanolamine tartrates, glycol mono-ricinoleate, organic nitrites, mercaptans, sulfonated hydrocarbons, fatty oils, triazoles, mercaptobenzothiazoles, phenothiazine, and piperazine. Illustrative of the inorganic materials that have been used as corrosion inhibitors are sulfates, sulfides, fluorides, hydrogen peroxide, alkali metal chromates, nitrites, phosphates, borates, tungstates, molybdates, carbonates, and silicates.

Silicates, particularly alkali metal silicates and certain silicones and silicate-silicone copolymers, have been suggested for use in antifreeze compositions to retard the corrosion of metal surfaces of internal combustion engines as disclosed in U.S. Pat. Nos. 3,341,469; 3,337,496; 3,312,622; 3,198,820; 3,203,969; 3,248,329; 3,265,623; 3,121,692; and others. While it has been found that compositions containing alkali metal silicates are effective corrosion inhibitors for metals in internal combustion engines, especially aluminum, the use of such metallic silicates in antifreeze compositions is disadvantageous since these antifreeze compositions have poor shelf life and/or use life, that is, a tendency to gel and form precipitates on standing prior to dilution of antifreeze concentrates by the consumer or during use as a coolant. With respect to the water-soluble organo-silicones and water-soluble silicate-silicone copolymers which have been suggested for use in antifreeze compositions, it has been found that it would be desirable in such systems if greater reserve alkalinity could be incorporated into the system thereby reducing the corrosion tendency on long term use as a coolant.

In U.S. Pat. No. 2,832,742, there is disclosed an ethylene glycol base coolant for use in automobile radiators containing a corrosion inhibiting composition composed of equal parts of para tertiary butyl benzoic acid and a high molecular weight aliphatic carboxylic acid derived from a petroleum fraction. In U.S. Pat. No. 2,197,774 there is disclosed the use of aromatic nitrohydroxy compounds wherein the nitro and hydroxy groups are directly attached to the aromatic nucleus or positioned only on a side chain. In Canadian Pat. No. 990,060 there is disclosed ethylene glycol based antifreeze compositions containing alkali metal silicates and alkali metal nitrites as corrosion inhibitors which are buffered at a pH of about 9 to about 10.5. There is no indication in any of these references that hydroxybenzoic acids such as parahydroxy benzoic acid are effective pH buffers and corrosion inhibitors in such systems.

SUMMARY OF THE INVENTION

There are disclosed single-phase antifreeze and coolant concentrates comprising at least one alcohol selected from the group consisting of methanol, ethanol, propanol, ethylene glycol, diethylene glycol, triethylene glycol, propylene glycol and glycerol; a corrosion inhibiting amount of at least one water-soluble metal silicate; and, as an organic basic pH buffer and corrosion inhibitor, a hydroxybenzoic acid or mixtures thereof.

Preferably said alcohol is ethylene glycol and preferably the antifreeze concentrates of the invention are utilized as coolants upon dilution with water in internal combustion engines including those engines containing aluminum parts, for instance, aluminum cylinder heads. By the incorporation of at least one hydroxybenzoic acid into antifreeze compositions containing metal silicates, the pronounced tendency of the metal silicates to gel can be overcome. The organic pH buffers and corrosion inhibitors of the invention are especially advantageous as compared to the alkali metal borate buffers.

DESCRIPTION OF THE PREFERRED EMBODIMENTS

The compositions of this invention contain a novel corrosion inhibiting organic basic buffer which is a hydroxybenzoic acid or mixture thereof, preferably para hydroxybenzoic acid. The meta and ortho forms of (mono) hydroxybenzoic acid as well as the dihydroxybenzoic acids are also useful, i.e., 2,6- and 2,4-dihydroxybenzoic acids. The use of such buffers serves to maintain the pH of the antifreeze or coolant composition above a pH of about 9 to about 11, preferably a pH above about 9.5 to 10.5 in order to minimize corrosion which increases with the decreasing pH of the antifreeze system. Additionally, where a water-soluble metal silicate is utilized as a component of the antifreeze composition, the buffering of the pH by the hydroxybenzoic acid compounds of the invention serves to maintain the metal silicate in solution by preventing gel formation which increases with decreasing pH below a pH of about 9. While many basic pH buffers have been used in the past in antifreeze compositions to maintain the pH above 7, the alkali metal borate salt buffers preferred for use therein as taught by the prior art such as sodium tetraborate, sodium orthoborate, and sodium metaborate are ineffective in preventing gel formation during use of the antifreeze where the antifreeze composition contains water-soluble metal silicates.

The amount of the hydroxybenzoic acid basic pH buffer utilized in the compositions of the invention depends to some extent upon the desired shelf life of the antifreeze concentrate containing the buffer, the effectiveness of the particular hydroxybenzoic acid selected and the proportions of the other components of the antifreeze concentrate composition. Generally, amounts of the hydroxybenzoic acid buffer compositions of the invention range from about 0.1 percent to about 1.5 percent by weight, preferably about 0.5 percent to about 1.2 percent by weight based upon the weight of the alcohol used in the antifreeze concentrates of the invention. The use of lesser amounts of the buffers of the invention can result in a significant decrease in the pH of the coolant in a relatively short use time whereas the use of greater amounts of the buffer can involve the expenditure of needless amounts of money and possibly lead to insolubility problems. No advantage is generally gained by departing from the indicated proportions or from the use of additional basic pH buffer materials known in the prior art.

The alcohols that are suitable for use in preparing the antifreeze and cooling compositions of the invention include both monohydric alcohols and polyhydric alcohols. Thus, methanol, ethanol, and propanol as well as ethylene glycol, diethylene glycol, triethylene glycol, propylene glycol and glycerol are useful. Mixtures of these alcohols are also useful in the compositions of this invention. Ethylene glycol is an especially useful alcohol. The alcohol and coolant concentrates of the invention are useful as a heat transfer medium in the cooling systems of internal combustion engines both undiluted or upon dilution with relatively large amounts of water. The antifreeze concentrates of the invention are adapted to economical shipment and storage; the concentrate being shipped to the point where it is to be used in diluted form as a coolant. Water imparts desirable properties to both the concentrate and coolant compositions of the invention since small amounts of water tend to lower the freezing point of the concentrate composition and large amounts of water improve the heat transfer properties of the coolant compositions. The antifreeze concentrate compositions of the invention can contain about 0.1 percent by weight to about 10 percent by weight of water based upon the weight of the concentrate. The concentrates preferably contain about 1 to about 5 percent by weight of water, and most preferably about 2 to about 3 percent by weight of water, based upon the weight of the concentrate. Generally the coolant compositions contain about 25 percent to about 90 percent by weight of water based upon the total weight of the diluted concentrate. The pH of both the antifreeze concentrate compositions of the invention and the coolants diluted with the above larger amounts of water generally should be maintained at greater than about 9 to about 11 in order that corrosion of metals with which the compositions come in contact will be minimized. Any alkali such as one or a mixture of the alkali metal hydroxides can be used to adjust pH.

Various additives known in the prior art can be added to the antifreeze concentrate compositions of the invention or to the coolant compositions in order to impart special properties thereto. For instance, antifoam agents, identifying dyes, pH indicators, conventional metal corrosion inhibitors, alcohol oxidation inhibitors, sealants which prevent leakage of the coolant from the coolant system, anticreep agents which prevent seepage of the coolant into the crankcase of the internal combustion engine, and the like can be added to either or both the antifreeze concentrates of the inventions or the diluted coolant compositions of the invention. It should be noted that, while the antifreeze and coolant compositions of this invention are single-phase compositions, the addition of various additives insoluble in the alcohol or in water can render these compositions two-phase (for instance, the addition of an insoluble defoamer or sealant additive which prevents leakage of the coolant from the cooling system). While the antifreeze concentrates and coolant compositions of this invention are particularly suitable for use either alone or upon dilution with water as coolants suitable for use in the cooling system of an internal combustion engine, the compositions can be advantageously employed in other applications such as heat transfer fluids or hydraulic fluids.

The corrosion inhibiting, water-soluble metal silicates are well known in the art. The silicates are used in the coolant concentrate compositions of the invention generally in a corrosion inhibiting amount, preferably about 0.05 to about 0.5 percent by weight based upon the weight of the concentrate. The preferred water-soluble metal silicates can be represented by the average formula $$M_2O(SiO_2)_n$$

wherein M is an alkali metal and n has a value of about 0.5 to about 4 inclusive. Illustrative of these silicates are the alkali metal orthosilicates, the alkali metal metasilicates, and the alkali metal di-, tri-, and tetrasilicates. Specific examples of these silicates are potassium metasilicate, sodium orthosilicate, potassium disilicate, lithium orthosilicate, lithium metasilicate, lithium disilicate, rubidium disilicate, rubidium tetrasilicate, mixed silicates such as sodium and potassium metasilicates. The preferred silicates are sodium and potassium silicates and the sodium and potassium metasilicates. These silicates are known in the art and are further described in U.S. Pat. No. 3,337,496, incorporated herein by reference.

The improvements in stability and corrosion inhibition resulting from the use of the hydroxy benzoic acid buffer compositions in combination with the alcohol and silicate components of the antifreeze concentrate compositions of the invention were discovered through evaluation utilizing laboratory tests. Certain of these tests are designed to simulate field conditions.

The following test methods were used in evaluating corrosion resistance of the antifreeze coolant compositions of the invention.

MODIFIED GLASSWARE TEST

This is a laboratory test for determining pitting corrosion of aluminum in aqueous alcohol antifreeze solutions such as are used in the cooling systems of internal combustion engines. Coupons of 3003 aluminum alloy and 3003 aluminum alloy clad with 7072 aluminum alloy were stacked separated by plastic insulators. In order to determine the tendency toward crevice corrosion, a rubber hose useful in automotive applications was cut into sections similar in size to the aluminum alloy coupons and placed between the last two coupons on either end of a stack of coupons being evaluated for corrosion. The stack of coupons was immersed in an antifreeze solution containing 25 percent by weight of an antifreeze concentrate. Dilution with water was made, said water containing 300, 500, and 1000 parts per million chloride ion respectively. The solutions were heated for a period of four hours at a temperature of 200° F., cooled for two hours and left at ambient temperature conditions for six hours to constitute a single cycle. This twelve hour cycle was repeated for about two weeks. At the end of the test period, the coupons were disassembled and rinsed with water and acetone and subsequently examined under the microscope. The antifreeze formulation under evaluation was given a rating depending upon the severity of the pitting and crevice corrosion found.

THE ULTRASONIC CAVITATION ERROSION TEST

This is a laboratory test procedure for the evaluation of internal combustion engine coolants to determine their capability to prevent cavitation-erosion of aluminum test specimens using ultrasonic energy to produce the cavitation effect. The test involves subjecting aluminum specimens to the test conditions while totally immersed in a 15 percent coolant solution during a period of 20 hours at a temperature of 82°±2° C. in an ultrasonic tank. Comparison is made of the average weight loss incurred by the specimens under test against the weight loss of specimens in a reference coolant solution. The average weight loss is determined to calculate the aluminum cavitation-erosion rating of between 1 and 10, with a rating of 10 showing no corrosion. This test method corresponds with ASTM D-2966, incorporated herein by reference.

The following examples illustrate the various aspects of the invention. When not otherwise specified throughout this specification and claims, temperatures are given in degrees centigrade and parts, percentages and proportions are by weight.

EXAMPLE 1

(Comparative Example Forming No Part of This Invention)

Utilizing a modified glassware test, as is more fully described above, 25 parts by weight of a reference antifreeze concentrate composition was diluted with 75 parts by weight of water containing respectively 300, 500 and 1000 parts per million of chloride as sodium chloride. Thereafter, three aluminum alloy No. 3003 coupons measuring 2 inches by 4 inches by 1/16 inch were placed in each of the above diluted antifreeze concentrate compositions. The alloy coupons were insulated from each other and placed ¾ of an inch above the bottom of the beaker utilizing brass supporting structures. The solutions were heated four hours at a temperature of 190° F. and then cooled to ambient temperature over a period of two hours and allowed to remain at ambient temperature for six hours to make a 12 hour cycle which was repeated for the duration of the test which lasted a period of two weeks.

The reference antifreeze concentrate used in this example had the following composition:

| Ingredient | Parts by Weight |
| --- | --- |
| ethylene glycol (antifreeze grade) | 95.8 |
| borax, pentahydrate | 1.10 |
| trisodium phosphate | 0.42 |
| sodium metasilicate | 0.16 |
| sodium nitrate | 0.21 |
| sodium mercaptobenzothiazole (50% active) | 0.50 |
| sodium hydroxide (50% active) | 0.44 |
| defoamer (PLURONIC® L-61 Polyol) | 0.03 |
| water (deionized or soft water) | 1.33 |

After a two week period, the appearance of the alloy coupons indicated the presence of a few pits and a moderate extent of crevice corrosion. PLURONIC L-61 Polyol is an ethylene oxide, propylene oxide block copolymer having a molecular weight of about 1750 and 10 percent by weight ethylene oxide residue content, sold by BASF Wyandotte Corp.

EXAMPLE 2

(Comparative Example Forming No Part of This Invention)

Example 1 was repeated utilizing the same reference antifreeze composition as used in Example 1 but omitting the borax, pentahydrate in the amount of 1.10 parts by weight.

The results after two weeks indicate that the corrosion tendency as indicated by pitting was about the same as with Example 1. However, crevice corrosion was slightly worse. Streaks of white corrosion products formed above all freshly exposed aluminum.

EXAMPLE 3

Example 1 was repeated except that the borax, pentahydrate in the amount of 1.10 parts by weight was eliminated and para hydroxybenzoic acid in the amount of 0.5 parts by weight was substituted therefor.

After the two week period of test, the results as indicated by appearance show that the presence of para hydroxybenzoic acid completely eliminated the white streaks above freshly exposed aluminum surfaces as well as the pitting corrosion shown in Examples 1 and 2. In addition, the crevice corrosion was significantly improved over that shown in Examples 1 and 2.

EXAMPLE 4

(Comparative example forming no part of this invention)

Utilizing the cavitation erosion-corrosion test of ASTM D-2966, a control antifreeze composition was evaluated having the following composition:

| Ingredient | Parts by Weight |
| --- | --- |
| Ethylene Glycol (antifreeze grade) | 95.0 |
| Borax, Pentahydrate | 1.0 |
| Sodium Nitrate | 0.2 |
| Tolyl Triazole | 0.2 |
| Water | 3.6 |

This control antifreeze had a pH of 8.4 and upon evaluation in the cavitation erosion-corrosion test was given a rating of 3.3.

EXAMPLE 5

The procedure of Example 4 was repeated utilizing an antifreeze composition similar to that utilized in Example 4 except that the water was not utilized and 1 part by weight ortho hydroxybenzoic acid was added. The composition had a pH of 4 and was rated −4.6.

EXAMPLE 6

The procedure of Example 4 was repeated utilizing an antifreeze concentrate similar to that used in Example 5 except that the composition contained 1 part by weight of para hydroxybenzoic acid was substituted for otho hydroxybenzoic acid. The composition had a pH of 8.4 and was rated 8.1 when tested in the cavitation erosion-corrosion test.

EXAMPLE 7

The procedure of Example 4 was repeated using an antifreeze concentrate similar in composition to that utilized in Example 5 with the exception that the borax component was eliminated entirely and the composition contained 1 part by weight of ortho hydroxybenzoic acid. The composition had a pH of 8.4 and upon testing for cavitation erosion-corrosion was given a rating of 8.1.

EXAMPLE 8

Utilizing the cavitation erosion-corrosion test of ASTM D-2966, an antifreeze concentrate was evaluated for resistance to cavitation corrosion. The antifreeze concentrate had the following composition:

| Ingredient | Parts by Weight |
|---|---|
| Ethylene glycol (antifreeze grade) | 95.0 |
| Sodium metasilicate ($Na_2SiO_3 5H_2O$) | 0.4 |
| Tolyl Triazole | 0.2 |
| Ortho hydroxybenzoic acid | 1.0 |

The composition had a pH of 10.5 and upon evaluation utilizing this test, was given a rating of 4.0.

EXAMPLE 9

The procedure of Example 8 was repeated utilizing an antifreeze composition similar to that utilized in Example 8 except that instead of ortho hydroxybenzoic acid, the composition contained 1 part by weight of para hydroxybenzoic acid. The antifreeze composition had a pH of 10.5 and upon evaluation for cavitation corrosion, was given a rating of 10.0.

EXAMPLE 10

The procedure of Example 8 was repeated utilizing an antifreeze composition similar to that disclosed in Example 8 with the exception that the composition additionally contained 0.5 part by weight of ortho hydroxybenzoic acid and 0.5 part by weight of para hydroxybenzoic acid. The composition had a pH of 10.5 and was given a rating of 9.9 upon evaluation for cavitation corrosion.

While this invention has been described with reference to certain embodiments, it will be recognized by those skilled in the art that many variations are possible without departing from the scope and spirit of the invention and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A single-phase antifreeze or coolant concentrate consisting essentially of a major proportion of at least one alcohol selected from the group consisting of methanol, ethanol, propanol, ethylene glycol, diethylene glycol, triethylene glycol, propylene glycol and glycerol, an amount of about 0.05 to about 0.5 percent by weight of at least one water-soluble silicate and, as a pH buffer and corrosion inhibitor, about 0.1 to about 1.5 percent by weight of at least one hydroxybenzoic acid selected from the group consisting of ortho and para hydroxybenzoic acid, wherein said water-soluble silicate has the formula:

$$M_2O(SiO_2)_n$$

wherein M is an alkali metal and n has a value of about 0.5 to about 4, and wherein said buffer serves to maintain the pH of said antifreeze above about 9 to about 11.

2. The composition of claim 1 wherein said water-soluble alkali metal silicate is selected from the group consisting of alkali metal orthosilicates, alkali metal metasilicates, alkali metal tetrasilicates, alkali metal trisilicates and alkali metal disilicates.

3. The composition of claim 2 wherein said concentrate additionally contains about 0.1 percent to about 10 percent by weight of water based upon the weight of said concentrate.

4. The composition of claim 3 wherein said alcohol is ethylene glycol, and said hydroxybenzoic acid is para hydroxybenzoic acid.

5. A coolant composition consisting essentially of the coolant concentrate of claim 1 and about 25 percent to about 90 percent by weight of water based upon the total weight of the diluted concentrate.

6. The composition of claim 5 wherein said water-soluble alkali metal silicate is selected from the group consisting of alkali metal orthosilicates, alkali metal metasilicates, alkali metal tetrasilicates, alkali metal trisilicates and alkali metal disilicates.

7. The composition of claim 6 wherein alcohol is ethylene glycol, and said hydroxybenzoic acid is para hydroxybenzoic acid.

* * * * *